INVENTOR.
JOHN K. HELLER
BY
*A. Durham Owen*
ATTORNEY

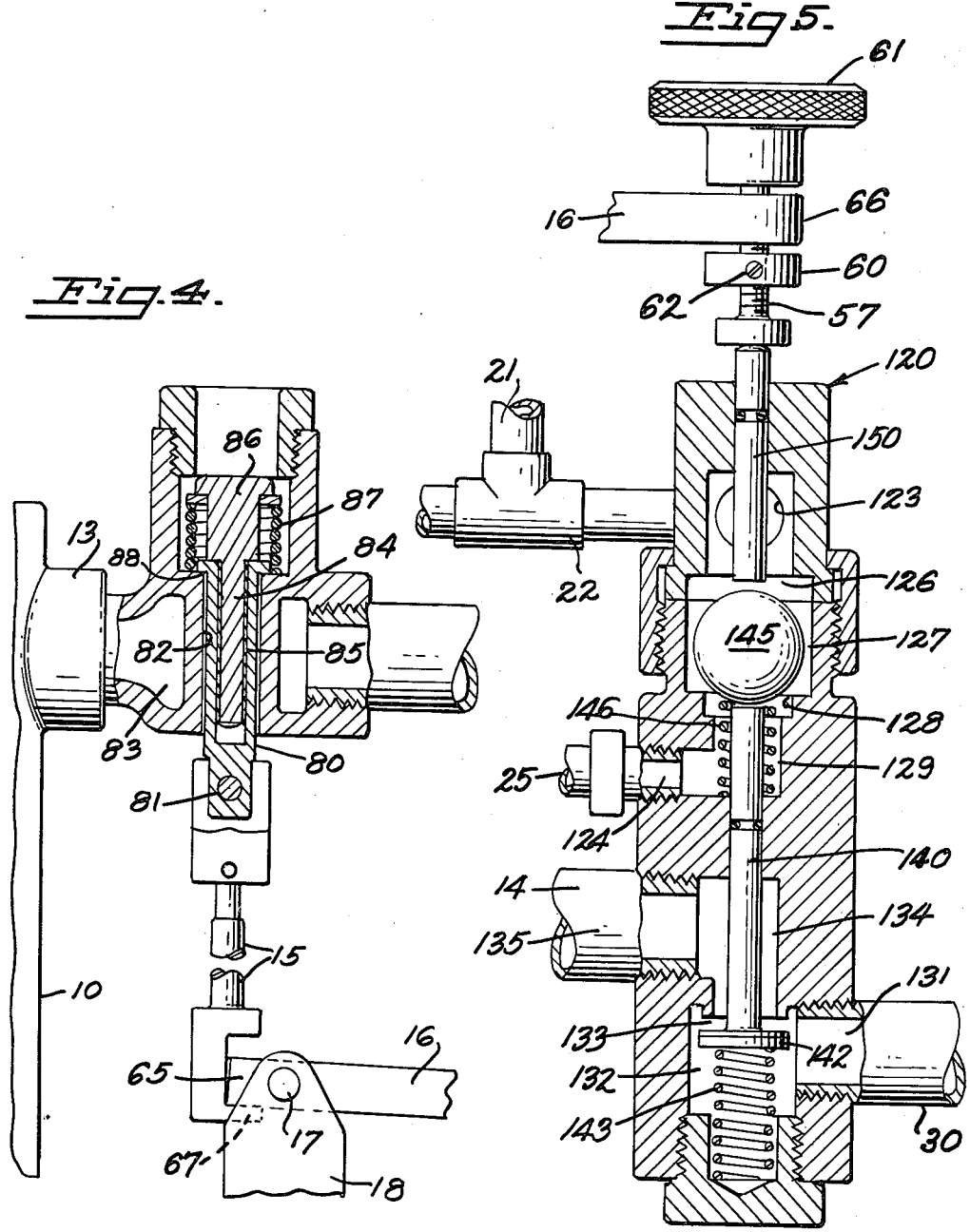

United States Patent Office 2,728,329
Patented Dec. 27, 1955

2,728,329
LIQUID HEATING SYSTEM AND CONTROL THEREFOR

John K. Heller, Woodside, Calif., assignor to Gas Systems, Inc., Kansas City, Mo., a corporation of Missouri Application December 17, 1951, Serial No. 261,937

14 Claims. (Cl. 122—448)

This invention relates to a system for heating or vaporizing a liquid or for heating a gas and to a control means therefor.

This invention solves the problem of holding the temperature of a boiler or other liquid-heater within a predetermined range. The burner which heats the boiler is automatically turned on whenever the boiler temperature falls below a predetermined minimum value, and the burner is automatically turned off whenever the boiler temperature rises above a pre-determined maximum value. The invention also provides means for introducing additional liquid to the boiler when a depletion thereof is indicated by a rise in the boiler temperature.

The automatic control of this invention utilizes the linear expansion of the boiler under heat to operate the control valve which turns the burner on and off, and, if desired, to operate a control valve that controls the supply of liquid to the boiler. In general, the invention includes a boiler secured to a stationary member adjacent one end, so that the boiler is free to expand toward its other end when it is heated. A rod is provided outside the boiler for movement with the boiler's free end. As the boiler expands under heat, the pull on the rod is utilized, through a lever system or other suitable means, to operate valves that control the supply of fuel to the burner, and, in some cases, the supply of liquid to the boiler.

Other objects and advantages of the invention will appear from the following description set forth in order to comply with the requirements of U. S. Revised Statutes, section 4888. The fact that certain details of construction are illustrated and described is not to be interpreted as narrowly limiting the invention to these details. The appended claims define the scope of the invention.

In the drawings:

Fig. 1 is a view in elevation and partly in section of a boiler system incorporating the principles of the present invention. The devices shown in its "on" position, with the burner lighted. The boiler and the thermal rod are shown broken in two to conserve space.

Fig. 4 is an enlarged view in elevation and in section of a portion of the overheat safety device which operates between the maximum desired temperature and the critical temperature of the fuse, showing the safety device in its overheat, compressed position.

Fig. 5 is a view in elevation and in section of a modified form of control valve.

Introductory description

Figure 1:
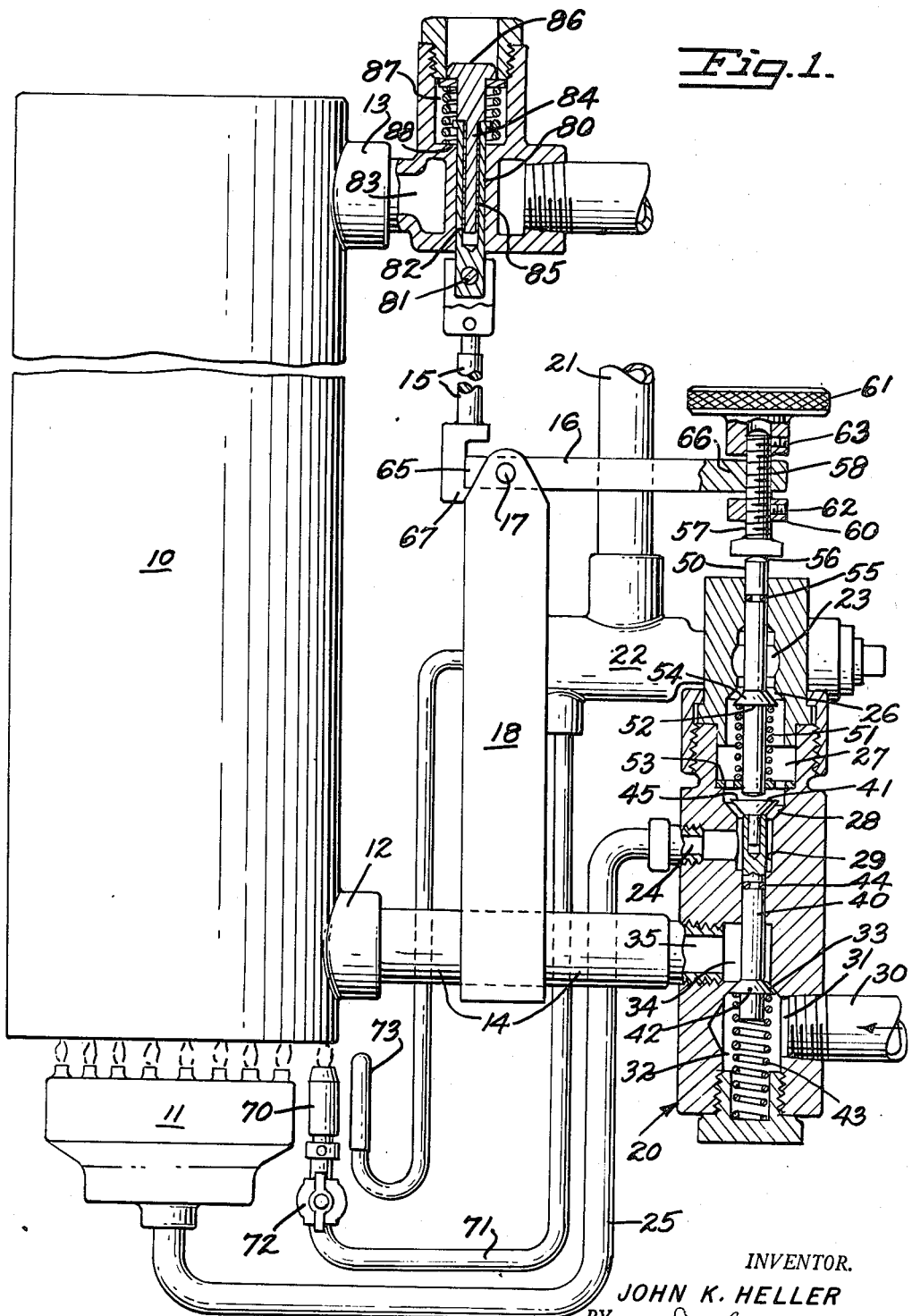

The boiler 10 is heated by a burner 11. Cold liquid enters the boiler 10 through an inlet 12, and hot liquid or vapor leaves the boiler through an outlet 13. The boiler 10 may be supported by a stationary inlet pipe 14, so that the upper end of the boiler 10 can expand with heat, thereby exerting pull on a rod 15. Movement of the rod 15 swings a multiplying lever 16 about its pivot 17 on a column 18, also secured to the stationary inlet pipe 14. The lever 16 operates a control valve 20 which turns on or off the supply of gas to the burner 11. When the boiler 10 reaches a predetermined maximum temperature, the control valve 20 shuts off the burner 11. When the temperature falls to a predetermined minimum temperature, the valve 20 turns the burner back on. The valve 20 may also admit more liquid to the boiler 10 when a predetermined temperature below the maximum temperature is reached, and cut off the supply of liquid when the temperature has fallen again.

The control valve 20

Gas from a low pressure gas supply pipe 21 passes through a manifold 22 and enters the control valve 20 through a gas inlet 23. Gas leaves the control valve 20 through an outlet 24 and passes through a pipe 25 to the burner 11. The passage of the gas through the valve 20 is from the inlet 23 through a port 26 (the function of which will be explained later), into a chamber 27, and from there, through the main cut-off port 28 into a passage 29 that leads to the outlet 24.

Liquid from a conduit 30 enters the valve 20 through an inlet 31 that leads to a chamber 32. A liquid cut-off port 33 joins the chamber 32 to a passageway 34 which leads to the liquid valve outlet 35. From there the stationary conduit 14 leads to the boiler inlet 12.

Figure 2:
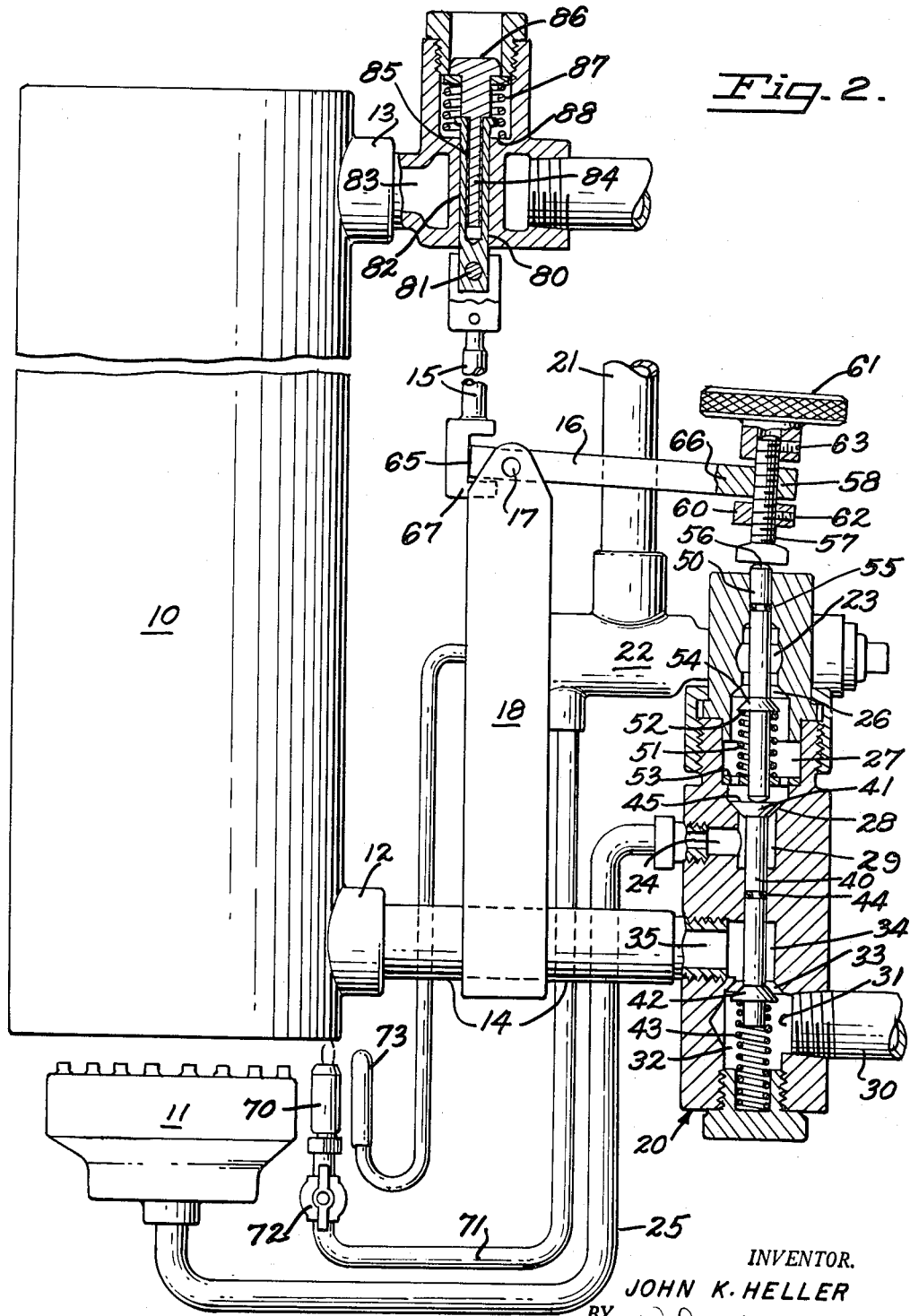
Fig. 2 is a view similar to Fig. 1 showing the system in its "off" position, with the burner not lighted.
Figure 3:
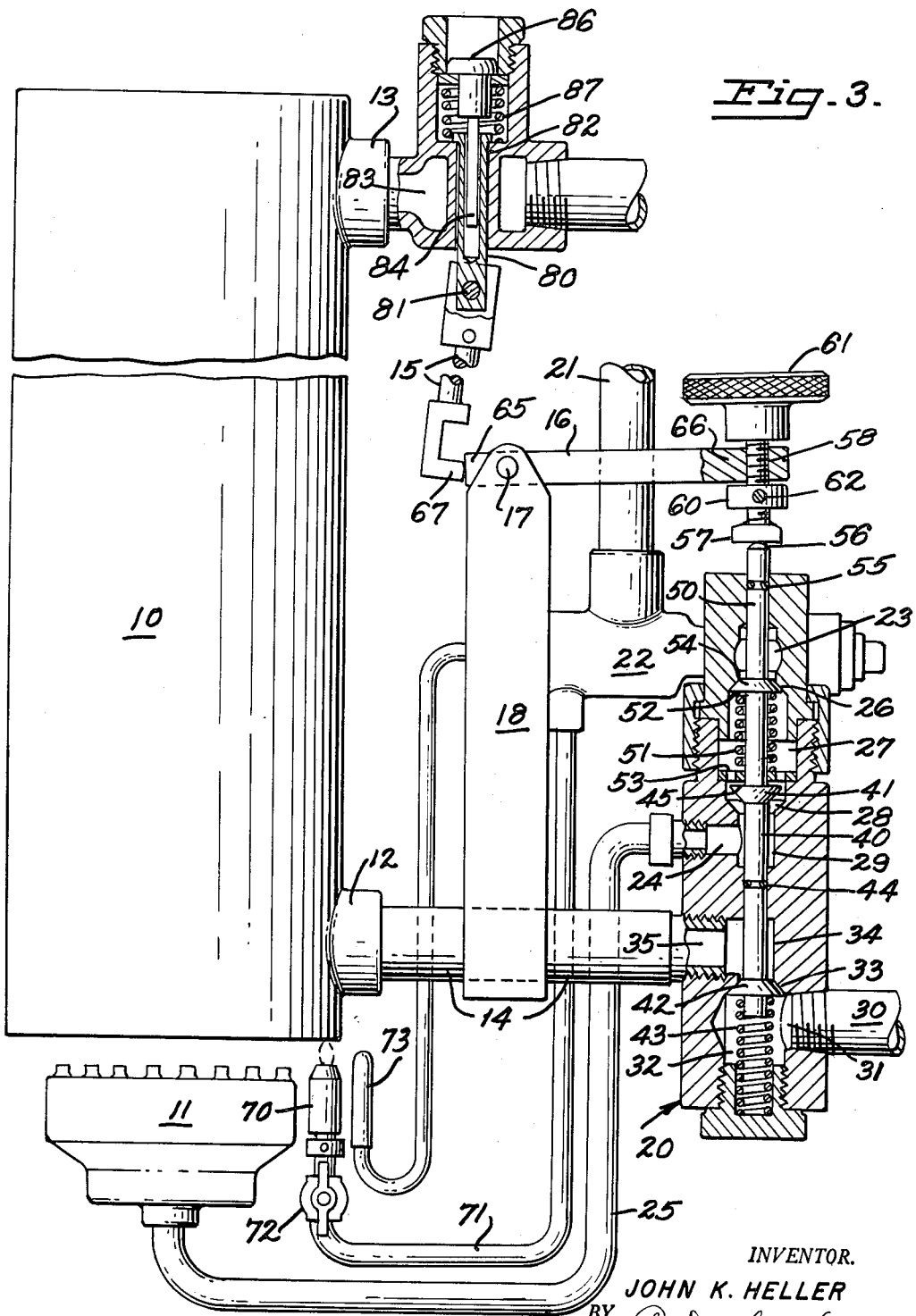
Fig. 3 is a view similar to Fig. 1, showing the operation of the safety fuse.

In the embodiment of the invention as shown in Figs. 1, 2, and 3, a main valve stem 40 controls both the flow of liquid to the boiler 10 and gas to the burner 11. The valve stem 40 does this by means of an upper valve or closure member 41 that opens and closes the gas cut-off port 28 and a lower valve or closure member 42 that opens and closes the liquid cut-off port 33. A spring 43, which is under compression, urges the valve stem 40 normally upwardly, so that the gas port 28 is normally open and the liquid port 33 is normally closed. Leakage of gas or liquid around the stem 40 is prevented by an O-ring 44.

So long as there is a full supply of liquid in the boiler 10 and so long as the boiler temperature remains below a predetermined level, gas will be supplied at its full flow rate to the burner 11 and no additional liquid will flow into the boiler (see Fig. 1). As the boiler 10 gets hotter, the rod 15 is pulled upwardly, swinging the lever 16 around its pivot and forcing a control stem 50 downwardly toward and then against the upper end 45 of the main stem 40. A further rise in temperature continues the downward movement of the control stem 50 and the main stem 40 is then pushed down against the pressure of the spring 43. The result will be that the valve 41 will begin reducing the supply of gas to the burner 11, and the valve 42 will open to admit a small flow of liquid into the boiler 10. Both these actions tend to reduce the boiler temperature, and if the temperature falls, the valve 41 will open wider again and the valve 42 will close. This will happen because the control stem 50 is itself urged normally upwardly (away from the stem 40) by a spring 51, under compression between a collar 52 on the stem 50 and a perforate web 53 in the chamber 27. In fact, if there is no outside pressure on the stem 50, the spring 51 will urge the control stem 50 upwardly until its closure member 54 closes against the port 26 and cuts off the supply of gas to the burner 11. Thus, if there is no outside pressure on the control stem 50, the supply of both gas and liquid will be cut off. This feature is utilized in the safety provisions discussed in a succeeding section.

If the small reduction in fuel supply to the burner 11 and the small increase in the fluid in the boiler, occasioned by the increase in temperature, are not sufficient to cause the boiler 10 to become cooler and relax the pull on the rod 15, the control stem 50 continues to push the main valve stem 40 down until the position shown in Fig. 2 is reached, where the valve 41 is fully closed against its seat 28, and the valve 42 is fully open. Then the burner 11 is completely cut off, and liquid is flowing at its full flow rate into the boiler 11. Both these factors tend to cause the boiler 10 to get cooler, and when it does, the valve stem 40 moves upwardly, opening the valve 41 (so that the burner 11 comes on again) and closing the valve 42 (so that the supply of liquid is cut off).

The lost motion connection between the stems 50 and 40 determines the range of temperature over which no further liquid is added and the supply of gas to the burner 11 remains constant. Therefore, this range can be changed by changing the dimensions of this lost motion connection.

The distance which the main valve stem 40 can move, between fully closing off the supply of gas to fully closing off the supply of liquid, may also be changed to give any desired rate of cut-off for either gas or liquid or for both of them.

*The control lever 16 and its operation of the stem 50*

The control stem 50 projects up out of the housing of the valve 20, an O-ring 55 preventing leakage of gas around it, and its upper end 56 terminates against the lower end of a screw member 57 which extends upwardly through and is threaded into an opening 58 through the lever 16.

A nut or collar 60, threaded on the screw 57 below the lever 16, and a knob 61 threaded on the screw 57 above the lever 16 provide stops to limit the adjustment of the screw 57 in the lever 16. Set screws 62, 63 hold the collar 60 and knob 61 in an adjusted position. By turning the knob 61, the screw 57 can be adjusted to change the temperature at which the valves 41, 42 will close and open. The screw 57 is normally set so that it presses down on the stem 50 and holds the overheat valve 54 open at all temperatures within the desired range.

As the boiler 10 is heated, it expands and exerts a pull on the thermal rod 15 lifting the left-hand side 65 of the lever 16 and depressing the right-hand side 66 of the lever 16. The lever 16 then pushes the threaded member down and depresses the stem 50. When the boiler 10 is cooling, the lever 16 swings in the opposite direction, and its right-hand side 66 lifts the screw 57, permitting the stem 50 to retract.

*The control rod 15*

The characteristics of the response may in part be controlled by the material from which the rod 15 and the pivot-supporting pillar 18 are made. If the rod 15 and pillar 18 are made from an alloy such as Invar having a co-efficient of expansion of practically zero, the temperature of the boiler at which the burner is lighted will not be affected by prevailing temperature conditions, nor will the temperature of the boiler at which the burner is turned off be affected by the prevailing atmospheric temperature. These actuating temperatures depend solely on the boiler temperature and remain the same under all circumstances. This type of operation is preferable for a steam boiler.

If the rod 15 and pillar 18 are made from the same metal as the boiler 10, the actuating temperatures will vary with the temperature of the atmosphere. In this case, however, the differences between the prevailing outside temperature (called the "ambient atmospheric temperature") and the actuating temperatures will be substantially constant. This type of operation is preferable for vaporizing many petroleum products.

Between these two types of operation, any intermediate type may be obtained, by varying the types of materials used in either the rod 15 or the pillar 18 or both of them.

The rod 15 is preferably releasably secured to the lever 16, as by the pawl catch 67. By releasing the catch 67, the boiler operation can be stopped, because the spring 51 will then push the stem 50 upwardly and seat the valve 54 against the port 26, thereby cutting off the supply of gas to the burner 11. At the same time the spring 43 will seat the valve 42, cutting off the supply of liquid to the boiler 10.

*Pilot system*

In order that the burner 11 will be lighted when gas flows and will be unlighted when the temperature reaches the maximum point, a pilot burner 70 may be provided, together with a standard safety system. For example, a pipe 71 may lead from the manifold 22 to the pilot burner 80, a cock 72 being provided to prevent gas from escaping when the system is closed down. A thermocouple 73 may be provided adjacent the pilot burner 80 to shut off a safety valve (not shown) in the manifold 22 and closing off the gas as it enters the manifold 22, if the pilot flame should be put out accidentally. One way of stopping operation of the boiler 10 is to shut off the pilot burner 70 when the burner 11 is off. The resultant cooling of the thermocouple 73 will close the safety valve (not shown). This system may be made to cut off the gas supply whenever the pilot burner 70 is off, regardless of whether the burner 11 is lighted or not. Even if this particular safety system should fail in some way to work, the safety system described in the following section will prevent accidents.

*Safety spring and safety fuse*

The attachment of the upper end of the rod 15 is provided with two types of safety features.

The upper end of the rod 15 is secured to a sleeve 80 by a pin 81. The sleeve 80 extends up through a hollow tube 82 in the outlet conduit 83 by which steam, vapor, or hot water are conducted away from the boiler outlet 13. A stud 84 fits inside the sleeve 80 and is held thereby solder 85, having a predetermined melting point. The connection may be made by tinning the outer surface of the stud 84 and the inner surface of the sleeve 80 with the solder 85, and then sliding the stud into the sleeve 80, while maintaining them at a temperature above the melting point of the solder, and then permitting them to cool.

A head or collar 86 may be provided at the upper end of the stud 84, and a relatively stiff stress limit spring 87 is compressed between the collar 86 and a stationary base 88. When the temperature of the boiler 10 exceeds the temperature at which the valve 41 closes off the supply of gas to the burner and the liquid valve 42 opens fully, damage to the valve 20, lever arm 16, rod 15 and associated parts is prevented by the further pull on the rod 15 merely compressing the spring 87 downwardly (see Fig. 4). Normally, the temperature of the boiler will soon drop, and the spring 87 will then be relaxed.

If, however, the temperature continues to rise, the tube 82 will become increasingly hotter and will melt the solder 85. Then the strain on the spring 87 and the rod 15 will pull the stud 84 out of the sleeve 80, and the rod 15 will fall to its fully relaxed position (Fig. 3), usually permitting the catch 67 to come off the end of the lever 16. In any case, the relaxation of the pull on the rod 15 alone will permit the spring 51 to push up the stem 50 and close the valve 54 against the port 26, cutting off the supply of gas to the burner 11. At the same time the valve 42 will close against its port 33, cutting off the supply of liquid to the boiler 10.

*Operation of the device of Figs. 1 to 4 as a steam boiler*

When the device is used as a steam boiler, operation may be started merely by lighting the pilot burner 70, whether or not there is any liquid in the boiler. In either event, the lighting of the pilot burner 70 will cause the thermocouple 73 to hold the safety valve (not shown) open, and gas will flow not only to the pilot burner 70, but also to the main burner 11 through the valve 20. The pilot burner 70 will then ignite the main burner 11, and the heating of the boiler 10 will begin.

As the boiler 10 gets hotter, it expands, and its upper end tends to pull the rod 15 upwardly, raising the left-hand side 65 of the lever 16. The right-hand side 66 of the lever 16 then moves downwardly, thereby forcing the member 57 and the control stem 50 downwardly. A further increase in the boiler temperature will first move the control stem 50 against the upper end 45 of the stem 40, and then the stem 40 will be forced downwardly. This causes the liquid valve 42 to open somewhat, so that liquid may flow from the liquid inlet conduit 30 into the pipe 14 and from there into the boiler inlet 12. At the same time, the valve 41 begins to reduce the flow of gas to the burner 11. If the addition of liquid to the boiler 10 and the reduced flow of gas to the burner 11 cool the boiler 10 sufficiently, then the valve 41 may not fully close and the stem 40 will be moved up and down a relatively small amount as the temperature in the boiler rises and falls.

If the boiler temperature 10 continues to rise in spite of the admission of liquid through the valve 42, then the main valve stem 40 will be forced down until the gas valve 41 is fully closed and the liquid valve 42 is fully opened (Fig. 2). This will turn off the burner 11 and the rapid flow of liquid will cool the boiler 10 more rapidly. However, if there should be a temporary rise in temperature beyond the point where the valve 41 is closed, the stress limit spring 87 will be compressed (Fig. 4) so that no damage will be done to the working parts, and the spring 87 will relax again as the temperature falls.

A further fall in temperature causes the rod 15 to move downwardly, and the spring 51 then pushes the stem 50, member 57, and the right-hand side 66 of the lever 16 upwardly. The valve 41 will open again and gas will flow into the burner 11, the flame being lighted by the pilot burner 70. At the same time the liquid valve 42 will be moved toward its seat 33, and the flow of liquid to the boiler 10 will first be reduced in volume and then entirely cut off. The flow of gas will increase as the spring 43 pushes the valve stem 40 upwardly. This cycle continues indefinitely, liquid being automatically introduced to the boiler 10 via the valve 42 and the burner 11 being automatically turned on and off by the valve 41, according to the increase and decrease of temperature in the boiler 10. The steam flows off through the outlet 13 into the outlet conduit 83.

If something should go wrong, so that the temperature of the boiler 10 increases beyond the point where the spring 87 is fully compressed (as for example if the valve 41 leaked), the steam in the outlet conduit 83 will melt the solder 85 which holds together the fuse made up of the stud 84 and the sleeve 80. When the solder 85 melts, the sleeve 80 will fall down (Fig. 3), and the rod 15 will move downwardly, causing the right-hand side 66 of the lever 16 to move upwardly. This will enable the spring 51 to seat the overheat valve 54 and cut off the supply of gas to the burner 11. At the same time, the spring 43 will seat the valve 41 and cut off the flow of liquid to the boiler 10.

The thermocouple 73 will cut off the entire supply of gas if the pilot burner 70 should go off accidentally.

Operation may be stopped at any time by turning off the supply of gas, by unlatching the member 67 from the lever 16, or by turning off the pilot burner 70. Adjustment of the temperature range may be made by changing the position of the collar 60 and knob 61.

Figure 7:
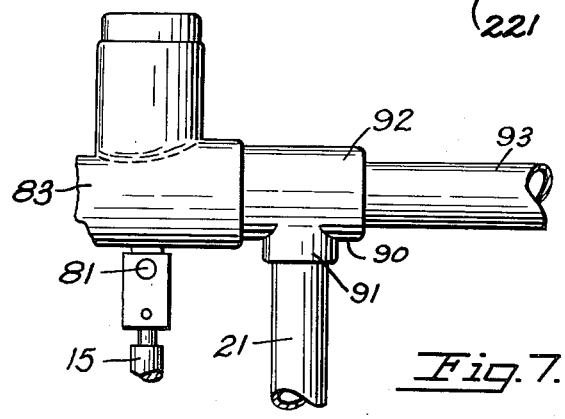
Fig. 7 is a view in elevation of a connection between the outlet conduit and the gas inlet conduit which may be used with the devices of Figs. 1 to 3 when fuel, such as petroleum gas, is being vaporized, a portion of the output then being used to supply the energy to vaporize the remainder.

*Operation of the device of Figs. 1 to 4 as a petroleum gas vaporizer using the structure of Fig. 7*

In using the device as a vaporizer for liquids whose vapor is combustible, a T fitting 90 may be provided in the outlet conduit 83 (shown in Fig. 7). Then the conduit 21 may be connected to one arm 91 of the T 90 and the remaining arm 92 is connected to the gas main 93. Except for this connection, the only difference in operation from that just described is in the starting. In this instance it is necessary to have some liquid in the boiler 10. This may be obtained by pushing down the temperature adjustment knob 61 until the stem 50 forces the stem 40 down and opens the liquid valve 42. Some liquid then flows into the boiler 10 and so long as the ambient temperature is not too low, some of this liquid will vaporize, and some gas will flow out the outlet 13 through the conduit 83 and the T 90 into the gas conduit 21. Then the pilot burner 70 may be lighted, and operation will proceed exactly as in the case of the steam boiler.

*A modified form of control valve*

Fig. 5 shows a modified form of valve 120 which may be substituted for the valve 20. There are some differences in structure, but the operation is substantially the same.

Gas from the manifold 22 enters the valve 120 through an inlet 123 and flows out an outlet 124 after passing through a port 126, chamber 127, port 128, and passageway 129. Liquid from the conduit 30 enters the valve 120 through an inlet 131 and flows into the chamber 132. It passes through the port 133 and passageway 134 to the liquid outlet 135.

A valve stem 140 supports a liquid cut-off valve 142 on its lower end. The valve 142 is preferably made from a soft resilient material or has a soft resilient seat. Normally, the valve 142 is held in its closed position against the port 133, by a spring 143.

A ball valve closure member 145 in the chamber 127 is not connected to any valve stem, but is urged normally upwardly by a spring 146. A stem 150 (analagous to the stem 50) extends down from beneath the pressure member 57 into the housing of the valve 120 and (during the normal temperature range of operation) prevents the spring 146 from seating the valve 145 against the upper port 126. The height of the chamber 127 gives a lost motion connection between the stem 150 and the stem 140.

In operation, the stem 150 will normally hold the valve ball 145 unseated from both ports 126 and 128. When the boiler 10 gets hot, the stem 150 will force the ball 145 down into contact with the stem 140. A further rise in temperature will then unseat the liquid valve 142, permitting liquid to flow into the boiler 10. A still further increase in temperature will open the valve 142 more widely and will seat the ball 145 against the port 128, cutting off the flow of gas to the burner 11. Upon retraction of the stem 150, as the boiler 10 cools, the springs 143 and 146 will force the valves 142 and 145 upwardly unseating the valve 145 and moving the valve 142 toward its seated position.

An excessive rise in temperature of the kind which melts the solder 85 in the fuse or other safety device will retract the stem 150 and the spring 146 will push the ball 145 upwardly and seat it against the port 126. At the same time the spring 143 will close the liquid valve 142.

*Another modified form of valve, for use in a hot water heater and the like*

Figure 6:
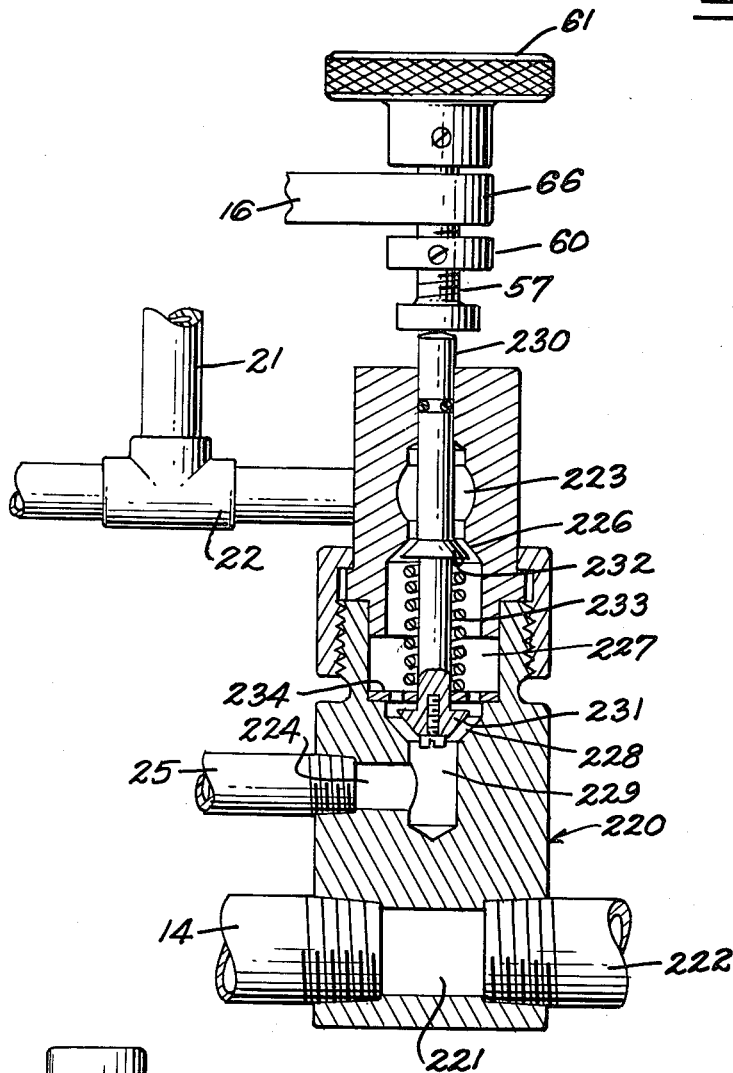
Fig. 6 is a view in elevation and in section showing a modified form of control valve in which there is no liquid control valve, which, for example, may be employed when the system is being used as a hot water heater.

Fig. 6 shows a modified form of valve 220 which may be used with a hot water heater or in any other environment where a steady inflow of liquid is desirable or where no liquid valve is needed. The liquid need not flow through the valve 220 at all, but the pasageway 221 provides a convenient connection between the inlet conduit 222 and the inlet pipe 14, and at the same time provides a convenient way of connecting the valve 220 with the inlet pipe 14, which serves as a base for the installation in the forms of the valve shown here. However, another form of stationary base or rigid mounting could be used, and then the conduit 222 and pipe 14 could be secured directly together.

Gas flows into the valve 220 from the manifold 22 through an inlet 223 and out from it into the pipe 25 by an outlet 224, after passing through an upper port 226, a chamber 227, a lower port 228, and an outlet passageway 229.

There is no stem corresponding to the valve stem 40 of the valve 20. Instead, there is a stem 230 somewhat like the control stem 50 but with a gas valve closure member 231 secured to its lower end and adapted to seal the lower port 228 when the temperature inside the boiler 10 becomes excessive. A valve closure member 232 is adapted to close the upper port 226 when the safety fuse comes apart, a spring 233 provided between the lower end of the valve closure member 232 and a web 234, accomplishing this result.

Operation of the valve 220 is similar to that of the valve 20 except that it does not control the liquid, the flow of which is usually determined by the consumption from the outlet of the heater. An increase in temperature in the boiler 10 causes the lever 16 to push the screw 57 and the stem 230 downwardly, narrowing the opening between the valve closure member 231 and the port 228, and (if the temperature gets hot enough), completely closing the valve 231 and turning off the burner 11. A reduction in temperature will cause the valve 231 to open again, and the pilot burner 70 will light the burner 11. The overheat valve 232 will be closed by the spring 233 if the soldered fuse comes apart.

In all forms of the above invention the thermal expansion of the boiler is used to control the burner and in some cases is also used to control the supply of liquid to the boiler. As described above, the operation is relatively foolproof, uniform, and safe.

I claim:

1. In a liquid heating device having an automatic temperature range control and including a stationary member, a boiler having a liquid inlet and a vapor outlet, said boiler being secured adjacent one end to said stationary member so that its opposite end is free to expand, a main gas burner beneath said boiler, a pilot burner beside said main burner, and a thermal control rod outside said boiler connected to and moved by the expanding end of said boiler, the combination therewith of: a connection between said rod and boiler comprising a sleeve and a spring mounted member that fits into and is soldered to said sleeve, said solder having a predetermined melting point at which relative motion between said spring-mounted member and said sleeve is permitted for safety purposes; a multiplying lever pivoted on said stationary member, with one end releasably connected to the thermal control rod; a screw secured in and passing through the opposite end of said lever, said screw being provided with adjustable stops for limiting the movement thereof; a first stem engaged by the lower end of said screw, said first stem including thereon a closure member; a valve housing into which said stem extends, said valve housing having a gas inlet, an overheat gas port opened and closed by the closure member on said first stem, a main valve gas port, and a gas outlet and also having, separated therefrom by a partition, a liquid inlet port, a liquid valve port, and a liquid outlet port; spring means normally urging said first stem toward the closed position of its closure member against said overheat port; a conduit connecting said gas outlet to said main gas burner; a conduit connecting said liquid outlet to said boiler inlet; a second stem on which is a main gas valve closure member and a liquid valve closure member; and spring means urging said second stem toward the position in which said liquid valve closure member is closed against said liquid valve port and said gas valve closure member is moved away from said main gas valve port; an increase in temperature in said boiler causing said boiler to expand and to pull on said rod, whereby said lever causes said first stem to move against the pressure of its spring means and into contact with said second stem, a further increase in temperature causing said first and second stems to move against the combined pressures of their respective spring means.

2. In a liquid heating device having an automatic temperature range control and including a stationary member, a boiler having a liquid inlet and a vapor outlet, said boiler being secured adjacent one end to said stationary member so that its opposite end is free to expand, a main gas burner beneath said boiler, a pilot burner beside said main burner, and a rigid rod outside said boiler secured to and moved by the expanding end of said boiler; the combination therewith of: a multiplying lever pivoted on said stationary member, with one end releasably connected to said rod; a screw passing through the opposite end of said lever; a first stem engaged by the lower end of said screw; a valve housing into which said stem extends, said valve housing having a gas inlet, a gas valve port, and a gas outlet and also having separated therefrom by a partition, a liquid inlet port, a liquid outlet port, and a liquid valve port; a conduit connecting said gas outlet to said main gas burner; a conduit connecting said liquid outlet to said boiler inlet; a second stem having a lost motion connection with said first stem and on one end of which is a gas valve closure member and on the other end of which is a liquid valve closure member, said members being adapted to close their respective ports in opposite directions; and spring means urging said second stem toward the position in which said liquid valve closure member is closed against said liquid valve port and said gas valve closure member is moved away from said gas valve port.

3. The device of claim 2 in which said screw is provided with adjustable stops for limiting the movement thereof.

4. In a liquid heating device having an automatic temperature range control and including a stationary member, a boiler having a liquid inlet and a vapor outlet, said boiler being secured adjacent one end to said stationary member so that its opposite end is free to expand, a main gas burner beneath said boiler, a pilot burner beside said main burner, and a longitudinally inelastic member outside said boiler secured to and moved by the expanding end of said boiler; the combination therewith of: a multiplying lever pivoted on said stationary member, with one end releasably connected to said longitudinally inelastic member and a stem-engaging member on its opposite end; a first stem engaged by said engaging member; a valve housing into which said stem extends, said valve housing having a gas inlet, a gas valve port, and a gas outlet and also having separated therefrom by a partition, a liquid inlet port, a liquid outlet port, and a liquid valve port; a conduit connecting said gas outlet to said main gas burner; a conduit connecting said liquid outlet to said boiler inlet; a second stem having a lost motion connection with said first stem and on one end of which is a liquid valve closure member; a gas valve closure member adapted to be moved by the other end of said second stem; said closure members being adapted to close their respective ports in opposite directions; and spring means urging said second stem toward the position in which said liquid valve closure member is closed against said liquid valve port and said gas valve closure member is moved away from said gas valve port.

5. The device of claim 4 in which the connection between said lever and said boiler includes a safety cut-off mechanism located in the connection between said boiler and said longitudinally inelastic member, comprising a sleeve secured to said longitudinally inelastic member, and a spring-mounted stud that fits into and is soldered to said sleeve, the solder having a predetermined melting point at which opposing forces operating on said sleeves and said stud cause relative motion between them and disconnect said longitudinally inelastic member from said boiler.

6. The device of claim 5 in which there is spring means tending to move said stud and sleeve apart.

7. The device of claim 5 in which there is a valve means for cutting off the flow of gas to said burner and means for normally urging said valve means toward a closed position for cutting off said heat, but restrained therefrom by said longitudinally inelastic member until said solder melts the connection between said stud and said longitudinally inelastic member, releasing said multiplying lever, said urging means then closing said valve means.

8. In a liquid heating device having an automatic temperature range control for liquid with an inflammable vapor, and including a stationary member, a boiler having a liquid inlet and a vapor outlet, said boiler being secured adjacent one end to said stationary member so that its opposite end is free to expand, a main gas burner beneath said boiler, a pilot burner beside said main burner, and a longitudinally inelastic member outside said boiler secured to and moved by the expanding end of said boiler; the combination therewith of: a multiplying lever pivoted on said stationary member, with one end releasably connected to said longitudinally inelastic member and a stem-engaging member on its opposite end; a stem engaged by said stem-engaging member; a valve housing into which said stem extends, said valve housing having a gas inlet, a gas valve port, and a gas outlet; a conduit connecting said boiler vapor outlet to said valve housing gas inlet; a conduit connecting said gas outlet to said main gas burner; a closure member for said gas port adapted to be closed thereagainst by said stem when actuated by said stem-engaging member; and spring means urging said gas valve closure member normally away from said gas valve port.

9. In a liquid heating device having an automatic temperature range control and including a stationary member, a boiler having a liquid inlet and a vapor outlet, said boiler being secured adjacent one end to said stationary member so that its opposite end is free to expand, a main gas burner beneath said boiler, a pilot burner beside said main burner, and a thermal control member outside said boiler secured to and moved by the expanding end of said boiler; the combination therewith of: a multiplying lever pivoted on said stationary member, with one end releasably connected to said thermal control member; a screw secured in and passing through the opposite end of said lever, said screw being provided with adjustable stops for limiting the movements thereof; a stem engaged by the lower end of said screw; a valve housing into which said stem extends, said valve housing having a gas inlet, a gas valve port, and a gas outlet; a conduit connecting said gas outlet to said main gas burner; a closure member adapted to be closed against said gas valve port by said stem when said stem is moved by said screw; and spring means normally urging said closure member away from said gas valve port.

10. In a liquid heating device having an automatic temperature range control and including a stationary member, a boiler having a liquid inlet and a vapor outlet, said boiler being secured adjacent one end to said stationary member so that its opposite end is free to expand, a main gas burner beneath said boiler, a pilot burner beside said main burner, and a thermal control member outside said boiler connected to and moved by the expanding end of said boiler, the combination therewith of: a connection between said thermal control member and said boiler comprising a sleeve and a spring-mounted member that fits into and is soldered to said sleeve, said solder having a predetermined melting point at which relative motion between said spring-mounted member and said sleeve is permitted for safety purposes; a multiplying lever pivoted on said stationary member, with one end releasably connected to the thermal control member and the other end provided with a stem-engaging means; a stem engaged by said stem-engaging means; a valve housing into which said stem extends, said valve housing having a gas inlet, an overheat gas port, a main valve gas port, and a gas outlet; an overheat port closure member operatively connected to said stem; a main valve port closure member operatively connected to said stem; spring means normally urging said overheat port closure member toward its closed position and said main valve port closure member away from its closed position, said stem holding said overheat port closure member open so long as the solder is unmelted; and a conduit connecting said gas outlet to said main gas burner, an increase in temperature in said boiler causing said boiler to expand and to pull on said thermal control member, whereby said lever causes said stem to move against the pressure of said spring means to move said main valve closure member toward its port, and a further increase in temperature causing the closure against said port of said main closure member, a total release of pull by said thermal control member, caused by the melting of said solder causing the release of the pressure by said stem on said spring means so that it closes said overheat port closure member against its port and cuts off the supply of gas to said burner.

11. The device of claim 10, adapted for use with liquids having inflammable vapor, in which the boiler vapor outlet is connected to the valve housing gas inlet, so that a portion of the vapor output is utilized as the burner gas.

12. In a liquid heating device having an automatic temperature range control and including a stationary member, a boiler having a liquid inlet and a vapor outlet, said boiler being secured adjacent one end to said stationary member so that its opposite end is free to expand, a main gas burner beneath said boiler, a pilot burner beside said main burner, and a thermal control member outside said boiler connected to and moved by the expanding end of said boiler, the combination therewith of: a connection between said thermal control member and said boiler comprising a sleeve and a spring-mounted member that fits into and is soldered to said sleeve, said solder having a predetermined melting point at which relative motion between said spring-mounted member and said sleeve is permitted for safety purposes; a multiplying lever pivoted on said stationary member, with one end releasably connected to the thermal control member; a stem-engaging member secured to the opposite end of said lever; a first stem engaged by the lower end of said screw, said first stem including thereon a closure member; a valve housing into which said stem extends, said valve housing having a gas inlet, an overheat gas port opened and closed by the closure member on said first stem, a main valve gas port, and a gas outlet and also having, separated therefrom by a partition, a liquid inlet port, a liquid valve port, and a liquid outlet port; spring means normally urging said first stem toward the closed position of its closure member against said overheat port; a conduit connecting said gas outlet to said main gas burner; a conduit connecting said liquid outlet to said boiler inlet; a main gas valve closure member; a liquid valve closure member; a second stem in operative connection with said gas valve closure member and said liquid valve closure member; and spring means urging said liquid valve closure member toward its closed position against said liquid valve port and urging said gas valve closure member away from said main gas valve port, an increase in temperature in said boiler causing said boiler to expand and to pull on said thermal control member, whereby said lever causes said first stem to move against the pressure of its spring means and into contact with said second stem, a further increase in temperature causing said first and second stems to move against the combined pressures of the respective spring means and thereby move said valve closure members against said pressure.

13. The device of claim 12 for use with liquids whose vapors are combustible, in which the boiler vapor outlet is connected to the gas inlet for the valve housing, so that combustible vapors produced from a suitable liquid may be utilized to operate the device.

14. In a heating device for liquids whose vapor is combustible, said device having an automatic temperature range control and including a stationary member, a boiler having a liquid inlet and a vapor outlet, said boiler being secured adjacent one end to said stationary member so that its opposite end is free to expand, a main gas burner beneath said boiler, a pilot burner beside said main burner, and a rigid rod outside said boiler secured to and moved by the expanding end of said boiler; the combination therewith of a multiplying lever pivoted on said stationary member, with one end releasably connected to said rod; a screw passing through the opposite end of said lever; a first stem engaged by the lower end of said screw; a valve housing into which said stem extends, said valve housing having a gas inlet, a gas valve port, and a gas outlet, and also having separated therefrom by a partition, a liquid inlet port, a liquid outlet port, and a liquid valve port; a conduit connecting said gas outlet to said main gas burner; a conduit connecting said liquid outlet to said boiler inlet; a conduit connecting said vapor outlet of said boiler to said valve housing gas inlet, so that a portion of the boiler output supplies all the vaporized fuel which vaporizes the whole of the liquid that is supplied to the boiler; a second stem having a lost motion connection with said first stem and on one end of which is a gas valve closure member, and on the other end of which is a liquid valve closure member, said members being adapted to close their respective ports in opposite directions; and spring means urging said second stem toward the position in which said liquid valve closure member is closed against said liquid valve port and said gas valve closure member is moved away from said gas valve port.

References Cited in the file of this patent

UNITED STATES PATENTS

| | | |
|---|---|---|
| 575,042 | Rowe | Jan. 12, 1897 |
| 866,265 | Crippen | Sept. 17, 1907 |
| 879,393 | Levilly | Feb. 18, 1908 |
| 937,948 | McAdam | Oct. 26, 1909 |
| 994,939 | Lemp | June 13, 1911 |
| 1,170,834 | Lovekin | Feb. 8, 1916 |
| 1,474,894 | Doble | Nov. 20, 1923 |
| 1,535,288 | Beilman | Apr. 28, 1925 |
| 1,574,132 | Smyser | Feb. 23, 1926 |
| 1,585,253 | Lovekin | May 18, 1926 |
| 1,612,270 | Duffie | Dec. 28, 1926 |
| 1,654,679 | Coddington | Jan. 3, 1928 |
| 1,981,012 | Wegner | Nov. 20, 1934 |
| 2,009,102 | Bern | July 23, 1935 |
| 2,022,728 | Lieberherr | Dec. 3, 1935 |
| 2,145,446 | Johnson | Jan. 31, 1939 |
| 2,166,914 | Little | July 18, 1939 |
| 2,396,032 | Waterman | Mar. 5, 1946 |
| 2,417,577 | Van Denberg et al. | Mar. 18, 1947 |
| 2,618,935 | Malir, Jr. | Nov. 25, 1952 |

FOREIGN PATENTS

| | | |
|---|---|---|
| 185,872 | Switzerland | Nov. 2, 1936 |
| 844,724 | France | July 31, 1939 |